M. LEITCH.
MILKING MACHINE.
APPLICATION FILED FEB. 20, 1915.
1,236,952.
Patented Aug. 14, 1917.
2 SHEETS—SHEET 1.
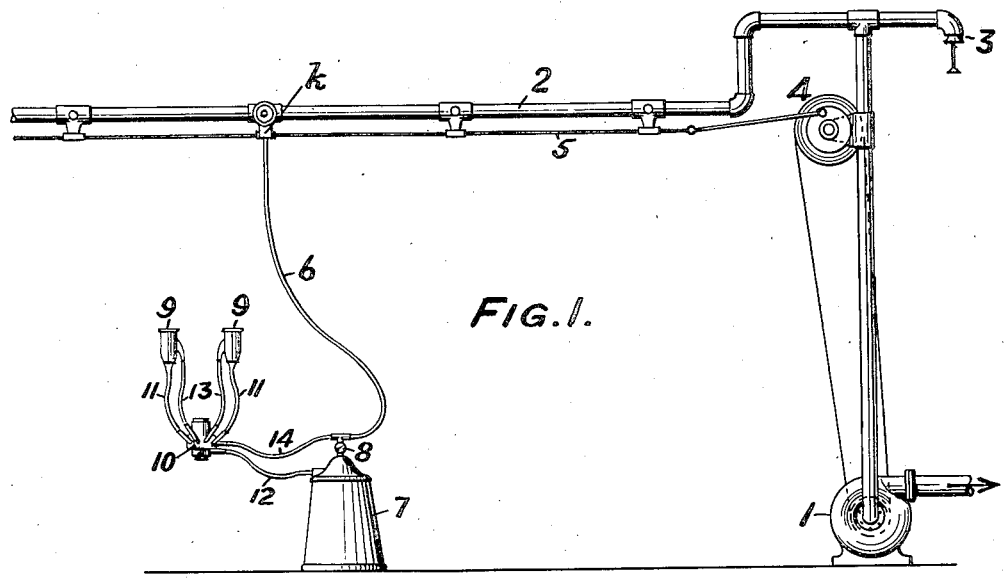
Fig. 1.
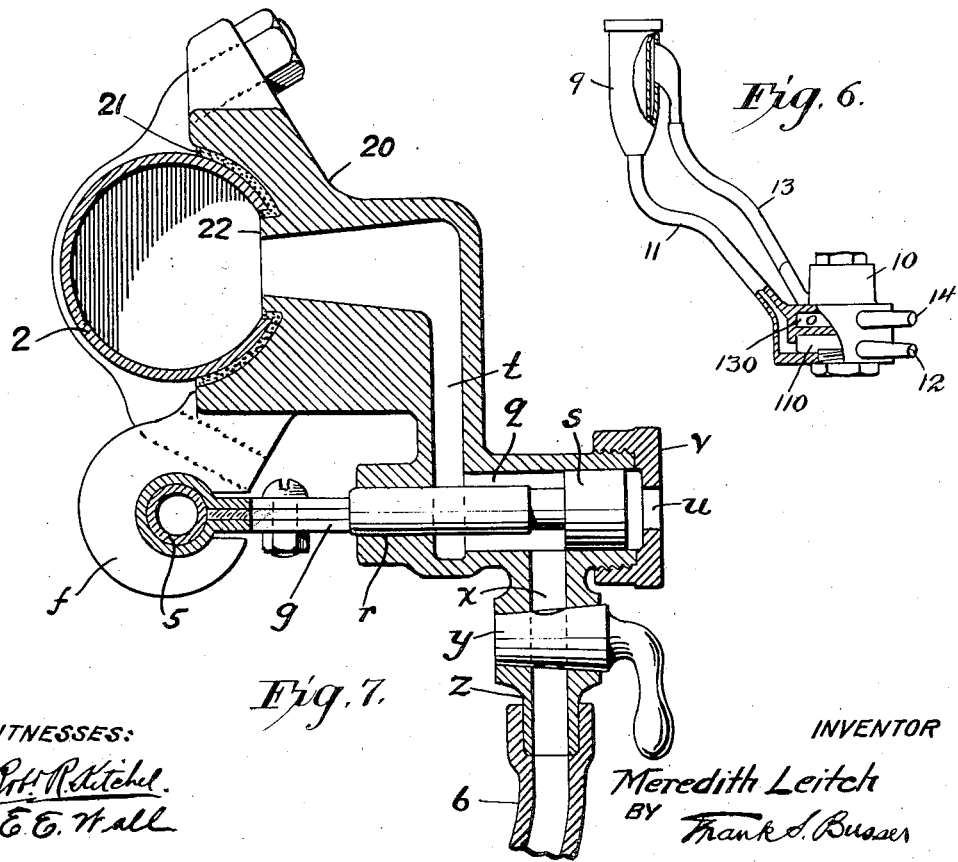
Fig. 6.
Fig. 7.
WITNESSES:
Rt. R. Kitchel.
E. E. Wall
INVENTOR
Meredith Leitch
BY Frank S. Busser
ATTORNEY.

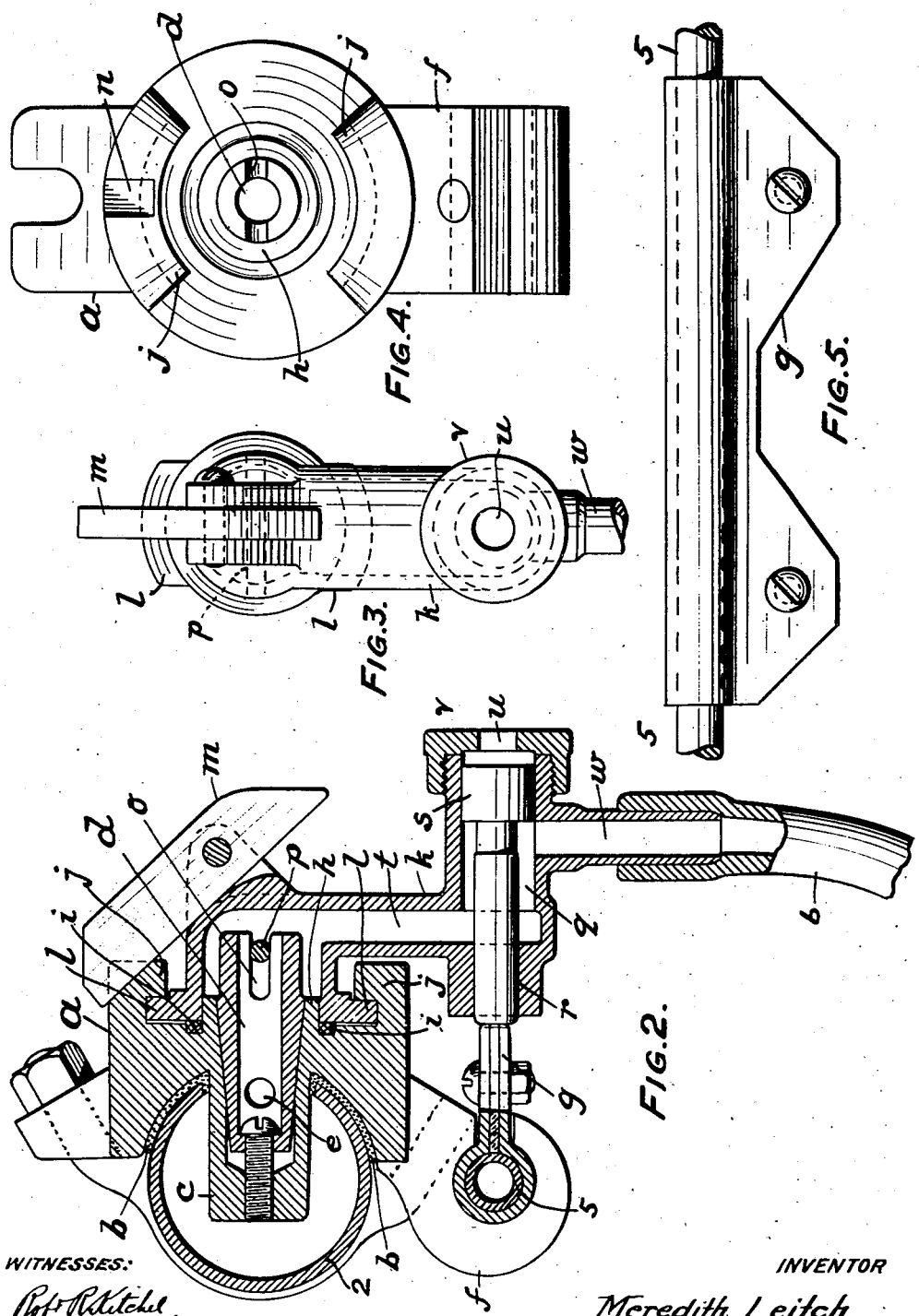

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

MILKING-MACHINE.

1,236,952.  Specification of Letters Patent.  Patented Aug. 14, 1917.

Application filed February 20, 1915. Serial No. 9,500.

*To all whom it may concern:*

Be it known that I, MEREDITH LEITCH, a citizen of the United States, residing at Poughkeepsie, county of Dutchess, and State of New York, have invented a new and useful Improvement in Milking-Machines, of which the following is a full, clear, and exact description, reference being had to the accompanying drawings, which form a part of this specification.

In Patent No. 1,163,161 issued to me December 7, 1915, on an application filed February 16, 1915, I have set forth an invention intended more particularly for application to that class of machines having two-chambered teat cups in which the inner or teat-receiving chambers are maintained constantly under and in communication with a source of suction while in the outer or pulsation chambers the pressure is varied so as to cause regular manipulation of the teats. In that application I have set forth a construction in which common pulsating means are provided to cause a constant suction on the nipple of the teat and to produce pulsations in the outer teat cup chambers to cause a manipulation of the upper portion of the base of the teat.

The present application relates to the same class of machines, has the same object, and accomplishes the same result by means which, while generically the same, are specifically different and present certain advantages thereover.

In the above named patent one of the specific embodiments of my invention set forth comprises a single cylinder pump which, operating through a pipe line connected direct with both the outer teat cup chambers and the milk pail, produces pneumatic pulsations in the former, and in the latter, due to the provision of a check valve, constant suction. This construction, in which the entire pipe line is subjected to the same pneumatic pulsations, involves handling a large volume of air and consequently requires a large pump and considerable power.

The object of the present invention is to provide means whereby, though the main pipe line is constantly under an approximately uniform low pressure equal to about half that of the atmosphere, the branch pipe leading therefrom will be subjected alternately to atmospheric pressure and to the above described low pressure; each branch pipe being connected, as in the said application, to the outer teat cup chambers to produce pulsations therein and to the milk pail to produce constant suction in the milk discharge from the teat cups.

Another object of the invention is to provide means whereby, in making the mechanical connection between the main pipe and the branch pipe, communication between the two will be automatically established.

Preferred embodiments of the invention are shown in the accompanying drawings, in which—

Figure 1 is a diagrammatic view of a complete installation for a four cow barn. Fig. 2 is a sectional view of the pulsator connector and pipe line fitting. Fig. 3 is a front view of the connector removed from the pipe line fitting. Fig. 4 is front view of the pipe line fitting with the connector removed. Fig. 5 is a plan view of the mechanically operated cam for actuating the pulsator valve. Fig. 6 is an elevation, partly broken away, of the claw and teat cups. Fig. 7 is a sectional view of a modified pulsator and connector.

A vacuum pump 1, driven from any convenient source of power, is connected to a vacuum pipe 2, which is made of large size so as to serve both as an air carrying pipe and as a vacuum reservoir. A vacuum regulating valve 3 opens to admit air when the vacuum exceeds a predetermined value. At 4 is a crank driven from the pump shaft and adapted to cause a slide rod 5 to reciprocate adjacent to the pipe line 2. A flexible tube or pipe 6 leads from the milk pail 7 to a pulsator connector *k* and contains a check valve 8 that allows air to pass from the milk pail but prevents its return. 9, 9 are teat cups. 10 is a claw. 11 is a pipe connecting the inner teat cup chamber with a chamber 110 in the claw, which in turn is connected by pipe 12 with the milk pail. 13 is a pipe connecting the outer teat cup chamber with an independent chamber 130 in the claw, which in turn is connected by pipe 14 with the pipe 6.

Referring first to the pulsator connector shown in Figs. 2, 3 and 4. *a* is a pipe line fitting which, with a soft gasket *b* interposed, is clamped to the pipe 2 by a U bolt. This fitting has a projection *c* adapted to enter a hole in the pipe 2 and containing a plug valve $d$. The plug $d$ is hollow and through its sides are ports $e$ which, when the plug is in the position shown, register with corresponding ports in the projection $c$ and provide communication between the interiors of plug $d$ and pipe 2. When the plug is turned 90° the holes do not register and the valve is closed. In the lower part of the fitting $a$ is formed a guide $f$ for the slide rod 5 and the attached cam $g$. On the front of the fitting $a$ and concentric with the plug $d$ is a boss $h$ around which is a seat for a soft packing ring $i$. Also concentric with the plug $d$ and the boss $h$ are two undercut quarter circle projections $j, j$.

$k$ is a pipe connector and pulsator. The back side of the upper end is adapted to fit around the boss $h$ and has two lugs $l$ adapted, when turned in the position shown, to enter beneath the undercut quarter circle projection $j$ and lock the connector $k$ to the fitting $a$ and force it against the gasket $i$. When in this position a latch $m$ on the connector $k$ enters a notch $n$ in the fitting $a$ and locks the connector so as to prevent accidental turning. When turned at right angles to the position shown, the lugs $l$ are free from the quarter circle projections $j$ and the connector $k$ is readily removable from the fitting $a$.

In the outer end of the plug $d$ are notches $o$ adapted to receive a cross pin $p$ in the connector $k$, so that when the connector $k$ is turned through a quarter circle, in attaching it to, or detaching it from, the fitting $a$, the plug $d$ will be turned through the same angle and the valve ports $e$ will be opened or closed.

In the lower part of the connector $k$ and in line with the cam $g$ is a valve chamber $q$ in which operates a piston valve $s$. Through a smaller bore $r$ the stem of the valve $s$ projects and contacts with the cam $g$. The inner end of the valve chamber $q$ is, by a passage $t$, in communication with the space around the outer end of the plug $d$. The outer end of the valve chamber is, by an opening $u$ in the cap $v$, in free communication with the atmosphere. From the center of the valve chamber leads a tube $w$ to which the flexible tube 6 is attached.

When ready to milk, the operator holds the connector $k$ in a horizontal position, places it against the fitting $a$ and turns it 90 degrees, when the latch $m$ drops into the notch $n$ and locks the connector in a vertical position. When the connector $k$ is so turned, the pin $p$ in the notches $o$ turns the plug $d$ and opens the valve ports $e$ placing the interior of the connector, including the passage $t$ and the valve chamber $q$, in communication with the pipe line and hence under a partial vacuum. Atmospheric pressure acting on the outer large end of the valve $s$ forces it inward with its stem against the cam $g$.

When a high portion of the cam is in contact with the valve stem, the valve is held to the right, as shown, and the tube 6 is in free communication with the pipe 2; hence the air is exhausted from it and all connected passages and chambers. When a low portion of the cam is in contact with the valve stem, atmospheric pressure acting on the large end of the valve forces it to the left and air at atmospheric pressure is free to enter, through the passage $u$ and the tube $w$, to the tube 6 and all connected passages and chambers.

In the simplified pulsator connector shown in Fig. 6, the pulsator body is integral with the pipe fitting. In this construction the pulsator body 20, with a soft gasket 21 interposed, is clamped to the pipe line 2 by a U-bolt and has a boss 22 adapted, by entering a hole in the pipe, to locate the connector on the pipe. The guide $f$, cam $g$, valve chamber $q$, bore $r$, valve $s$, passage $t$, opening $u$ and cap $v$, are the same in construction as the corresponding parts in the pulsator connector hereinbefore described. A passage $x$ leads through a plug cock $y$ and a nozzle $z$ to which the tube 6 may be attached.

In milking, the operation is the same as that of the first described device except that, to start the operation, the plug cock $y$ is opened.

In either embodiment of the invention, with the shape of cam $g$ shown, it may readily be seen that when the cam is at either end of its stroke, the tube 6 will be under a partial vacuum, while when the cam is in the center of its stroke the pressure in the tube will approach atmospheric. By varying the shape of the cam, different relations between movements of the slide rod 5 and pressures in the tube 6 may be obtained. The invention is not limited to a cam having a linear reciprocation nor to a mechanically operated cam nor to any specific structural features except in those claims wherein the invention is more specifically claimed.

Having now fully described my invention, what I claim and desire to protect by Letters Patent is:

1. A milking machine pulsator comprising a body having a valve chamber having openings adapted for communication respectively with the atmosphere, with a source of suction and with a pulsation pipe, a valve within the valve chamber adapted in one position to open communication between the source of suction and pulsation pipe and in another position to open communication between the pulsation pipe and the atmosphere, said pipe having a pressure face open to the atmosphere whereby it is moved in one direction, and a movable cam for moving it in the opposite direction.

2. A milking machine pulsator comprising a movable cam, a valve chamber communicating at one end with a passage adapted for connection with a source of suction, at the other end with the atmosphere, and between its ends with a passage adapted for connection with a pulsation pipe, and a valve within said chamber movable in one direction by said cam and in the other direction by atmospheric pressure and adapted in its movement to connect said second passage alternately with the atmosphere and with the first passage.

3. A milking machine pulsator comprising a body adapted for connection with a vacuum pipe and provided with a valve chamber, a vacuum passage adapted to connect the valve chamber and the vacuum pipe, and a pulsation passage leading from the valve chamber, a longitudinally reciprocable rod, a cam carried thereby, a valve in the valve chamber adapted to be moved in one direction by the cam, said valve having a pressure face communicating with the atmosphere whereby it is moved in the opposite direction, said valve in its movement connecting the pulsation passage alternately with the vacuum passage and with the atmosphere.

4. A milking machine pulsator comprising a vacuum pipe, a pipe line fitting, a connector having a valve chamber and a vacuum passage and a pulsation passage opening thereinto, said valve chamber also communicating with the atmosphere, a valve in the valve chamber adapted in its movement to connect the pulsation passage alternately with the atmosphere and with the vacuum passage, coacting members on the pipe fitting and connector adapted, when the connector is applied to the fitting and turned, to effect a locking engagement between them, and means operated by the connector in its turning movement to open communication between the vacuum pipe and the vacuum passage.

5. A milking machine pulsator comprising a vacuum pipe, a pipe line fitting, a connector having a valve chamber and a vacuum passage and a pulsation passage opening thereinto, said valve chamber also communicating with the atmosphere, a valve in the valve chamber adapted in its movement to connect the pulsation passage alternately with the atmosphere and with the vacuum passage, a cam movable on the fitting, coacting members on the fitting and connector adapted, when the connector is applied to the fitting and turned, to effect a locking engagement between them and swing said valve into operative relation with said cam, and means operated by the connector in its turning movement to open communication between the vacuum pipe and the vacuum passage.

6. A milking machine pulsator comprising a pipe, a fitting thereon, a cock movable in said fitting to open and close an outlet from the pipe in the fitting, lugs on the fitting, a separate connector, lugs thereon adapted to coact with the lugs on the fitting to attach the connector to the fitting, a latch on the connector adapted to engage a notch in the fitting when the connector is so attached to the fitting and thereby lock the connector from displacement, and coacting means on said connector and cock adapted, in the movement of the connector to attach it to the fitting, to move the cock into open position and adapted, in the releasing movement of the connector, to move the cock into closed position.

In testimony of which invention, I have hereunto set my hand, at Poughkeepsie, N. Y., on this 30th day of Jany., 1915.

MEREDITH LEITCH.

Witnesses:
CHARLES L. POWELL,
EDWARD F. WEIMAR.